United States Patent [19]

Harding

[11] 4,392,814
[45] Jul. 12, 1983

[54] FLUIDIZED BED

[75] Inventor: Brian Harding, West Bromwich, England

[73] Assignee: Can-Eng Holdings Limited, Niagara Falls, Canada

[21] Appl. No.: 156,530

[22] Filed: Jun. 4, 1980

[30] Foreign Application Priority Data

Jun. 8, 1979 [GB] United Kingdom ............... 7919979
Jul. 9, 1979 [GB] United Kingdom ............... 7923683

[51] Int. Cl.³ ............................................. F23D 19/02
[52] U.S. Cl. .................................. 431/170; 432/48; 110/245
[58] Field of Search ................ 431/170, 7; 122/4 D; 432/58, 48; 110/189, 245

[56] References Cited

U.S. PATENT DOCUMENTS 3,598,374 8/1971 Nauta ................................... 432/58
3,884,617 5/1975 Virr ..................................... 432/58
4,193,541 3/1980 Scheidweiler ................ 126/285 B

FOREIGN PATENT DOCUMENTS 54-137870 10/1979 Japan ................................ 110/245

Primary Examiner—Carroll B. Dority, Jr.
Attorney, Agent, or Firm—Steele, Gould & Fried

[57] ABSTRACT

This invention relates to a fluidized bed for use in heat treating articles, the bed having a container for containing a mass of refractory particles. The container has a porous base and a supply pipe for supplying a fluidizing gas to the underside of the porous base from which the gas will flow through the porous base and into the mass of refractory particles. The fluidizing gas flows through an adjustable control valve arranged in the supply pipe. There are also provided at vertically spaced positions above the upper surface of the porous base a pair of temperature transducers which are connected together to provide a signal which is dependent upon the difference in the temperatures at the vertically spaced positions, there being also provided power actuated means in the form of an electric motor which in use is arranged to receive the signal from the temperature transducers and then actuate the adjustable valve in accordance with the signal received.

5 Claims, 2 Drawing Figures

FLUIDIZED BED

BACKGROUND OF THE INVENTION

This invention relates to a fluidized bed. Such a bed may be used for example as a heating medium (when it could be used, inter alia, for removing paint or plastics materials from metal components or for the incineration of refuse and sewage) or as heat treatment apparatus which will carry out heat treatment processes (for example carbo-nitriding, oxy-carbo-nitriding, carburizing, neutral annealing, neutral stress relieving and neutral hardening) on a component or components immersed in the fluidized bed. When the fluidized bed is to be used as heat treatment apparatus, it is known to provide a bed formed of refractory particles, and means for supplying a gas or gas/air mixture, which not only provides a sufficient velocity of gas or gas/air flow for fluidizing the bed but which also provides within the bed in use the desired atmosphere for carrying out the required heat treatment process. In addition heat will, in use, be applied to the bed for an interval or intervals sufficient to maintain the bed at the desired temperature while the heat treatment is being carried out. Such heat may be provided in a number of ways. One way is to provide, for fluidizing the bed, a combustible (e.g. stoichiometric) mixture of fuel gas and air, this mixture then being ignited at the upper bed surface; the flame front will then gradually penetrate to the bottom of the bed. Alternatively, the fluidizing mixture can be heated to the desired working bed temperature before it is admitted to the fluidized bed. As a further alternative, cool fluidizing gases can be admitted to the bottom of the bed and heat supplied either by electrically energised elements disposed within the bed or by heating units disposed on the exterior of the bed wall. As yet another alternative, cool fluidizing gases can be admitted to the bed and heat supplied by means of combustion at or close to the upper surface of the bed, such combustion comprising for example "submerged" combustion (where gaseous fuel is burnt just beneath the upper surface of the bed) or alternatively a kind of "fireball" combustion where gaseous fuel is burnt just over the upper surface of the bed. The present invention is more particularly concerned with the arrangements in which cool fluidizing gases are admitted to the bottom of the bed.

In all cases however it is of course desirable to ensure, for reasons of efficiency, that the heat exchange which occurs in use between the particles of the bed and the work which is to be heated shall be as great as possible and it is known that this situation occurs when the velocity of the fluidizing gases (the optimum fluidization velocity) through the bed is approximately 2.5 to 3.0 times the gas velocity (the minimum fluidization velocity) at which fluidization first occurs. Factors which affect fluidization include the temperature of the bed itself and the size and density of the particles which make up the bed. Thus, for example a fluidized bed at a temperature of approximately 1000° C. will require a minimum gas fluidization velocity of about one tenth of the required minimum velocity at ambient temperature. Furthermore, it is necessary that the gas velocity should reach a certain minimum value before heat will effectively travel downwardly from a source of heat in the bed. Such minimum value is about three times the minimum fluidization velocity which in fact is compatible with the gas velocity that is required to obtain maximum heat transfer from the fluidized particles to work inserted therein, as previously mentioned. It is therefore possible to control the temperature in a fluidized bed by controlling the velocity of the fluidizing gas. To this end it is known to provide an adjustable flow control valve or an adjustable pressure regulating valve in a supply pipe which supplies the fluidizing gas to the bottom of the bed.

SUMMARY OF THE INVENTION

One object of the present invention is to provide a fluidized bed having, in a simple yet effective form, improved control means for adjusting such a flow control valve or pressure regulating valve.

In accordance with the invention there is provided a fluidized bed having a container for containing a mass of refractory particles, a porous base, conduit means for supplying, through an adjustable valve, a fluidizing gas or gaseous mixture to the underside of said porous base from which said gas or gaseous mixture will flow through the porous base and into the mass of refractory particles, and means, disposed above said porous base, for supplying heat to the mass of refractory particles, characterised in that there are provided at vertically spaced positions above the upper surface of said porous base, a pair of temperature transducers which are connected together to provide a signal which is dependent upon the difference in the temperature at said vertically spaced positions, and in that there is also provided power-actuated means which is arranged to receive said signal and to actuate said adjustable valve in accordance with the signal received.

Conveniently, said signal is an electrical signal and said power-actuated means comprises an electric motor.

The pair of temperature transducers (which may for example comprise a pair of thermocouples) may be arranged so that one is disposed near to the bottom end of the bed whereas the other is disposed near to the upper end of the bed. The two temperature transducers are then arranged to energise said electric motor to actuate the valve when the temperature difference measured by said transducers exceeds a predetermined value. Thus, in one embodiment, the electric motor will act to open said valve when the aforesaid temperature difference exceeds the predetermined value and the velocity of the fluidizing gas or gaseous mixture will be increased, thereby permitting increased fluidization and a greater transference of heat downwardly through the bed from said heat supplying means until the lower temperature transducer attains a temperature at which the temperature difference between the two transducers falls within the predetermined value. The velocity of the fluidizing gas or gaseous mixture is then maintained at a value corresponding to the degree of opening of the valve then reached but if said temperature difference becomes zero or undesirably small then the electric motor will operate to close the valve. In an alternative arrangement, the lower temperature transducer can be placed in a layer of refractory particles which are larger and/or denser than the remainder of the particles so that such layer will not become fluidized. In this case, opening of the aforesaid control valve will serve to cool the lower temperature transducer because of the greater rate of flow of the fluidizing gas or gaseous mixture (fluidization of said layer in which the lower transducer is placed still not occurring) and so in this case the electric motor driving said control valve will act to close the valve when it receives an electric signal indicating a temperature difference between the two transducers greater than the predetermined or set difference.

Furthermore, there may be provided a third temperature transducer which is disposed between the aforementioned temperature transducer so as to be, for example, at a level at or close to the centre of depth of the bed, such third transducer providing in use a measure of the temperature of the centre of the bed.

Conveniently, the fluidized bed is provided with second conduit means which are disposed in the upper part of said bed but beneath the upper surface of the mass of refractory particles when fluidized for admitting into said upper part of the bed air and/or a combustible gas, said second conduit means being connected to supply pipes which extend at least in part downwardly into the container from the upper end thereof without passing through the wall of the container at positions below the level of said upper surface of the mass of refractory particles when fluidized.

Said second conduit means may comprise air conduit means and separate gas/air conduit means, said air conduit means and gas/air conduit means extending around the inner surface of the wall of the container and being generally vertically aligned with each other so that they will not occupy an unacceptably large amount of the cross-sectional area of the container when seen in plan view.

There may also be provided third conduit means which are disposed in said bed beneath the second conduit means, said third conduit means being connected to supply pipes which also extend at least in part downwardly into the container from the upper end thereof without passing through the wall of the container at positions below the level of the upper surface of the mass of refractory particles when fluidized. Said third conduit means is adapted to receive a supply of air which can flow through it without being discharged into the fluidized bed, for the purpose of cooling the bed when desired.

BRIEF DESCRIPTION OF THE DRAWINGS

The invention will now be more particularly described with reference to the accompanying drawing wherein.

DETAILED DESCRIPTION OF THE PREFERRED EMBODIMENTS

Figure 1:
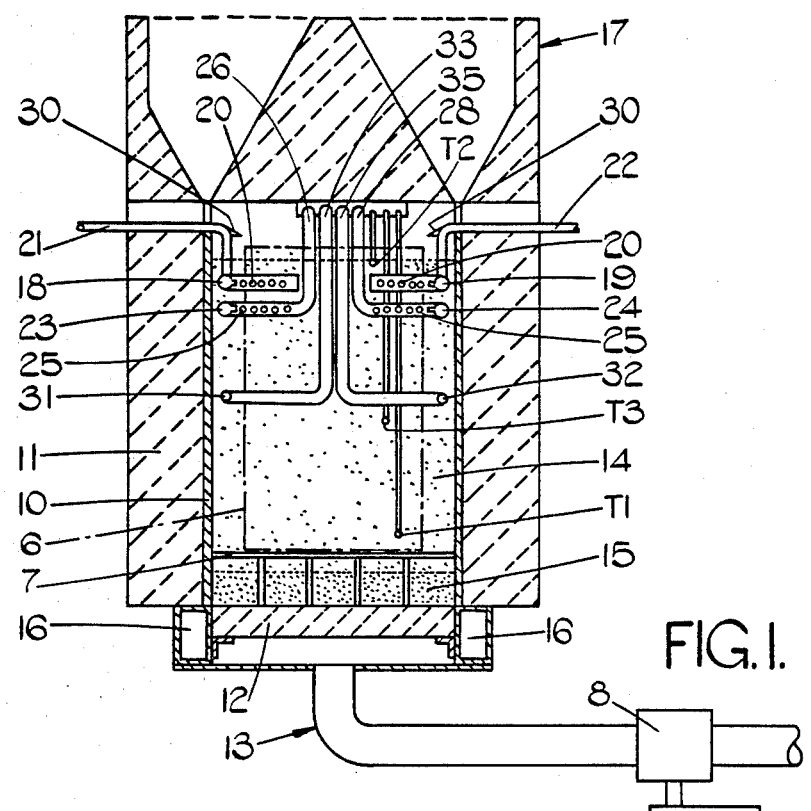
FIG. 1 is a side elevation of one example of a fluidized bed constructed in accordance with the invention; and, FIG. 2 is a fragmentary perspective view of the fluidized bed of FIG. 1.
Figure 2:
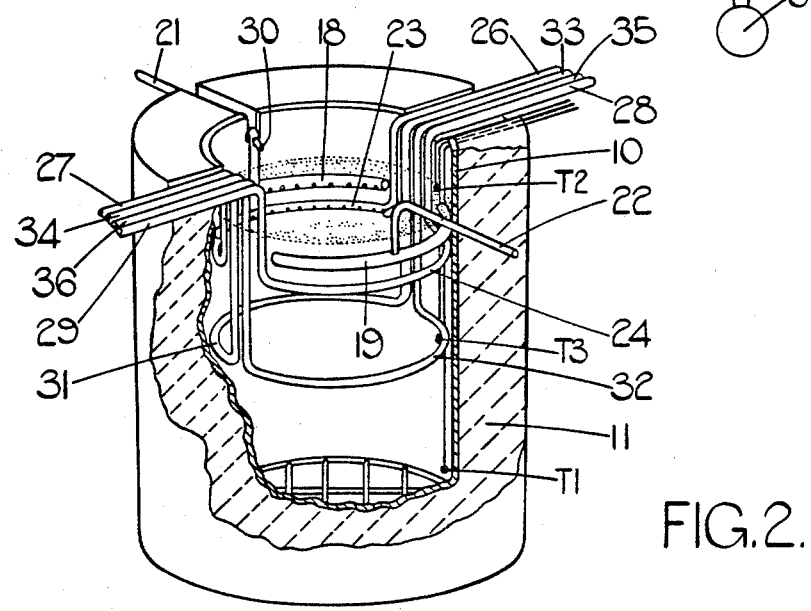

Referring now to the drawing the example of a fluidized bed shown therein is intended for use as a heat treatment apparatus although, as previously indicated, a fluidized bed constructed in accordance with the present invention could be used in other applications if desired.

In the example shown in the drawings the fluidized bed is provided with a container 10 which may be formed of metal and which is surrounded by heat insulating material 11. The base of said container is closed by a porous ceramic tile 12 (or by other forms of porous base such as a steel plate or assembly of tubes drilled with a plurality of small holes) and beneath said tile there is first conduit means indicated by reference numeral 13 through which in use a gaseous medium will flow from any convenient source of supply (not shown) through a control valve 8 (which may comprise a variable flow control valve or a pressure regulating control valve) to the underside of said tile 12 whence it will pass upwardly through said tile and into a mass of refractory particles 14. The operating member of the valve 8 is connected to power-actuated means in the form of an electric motor 9. The gaseous medium flowing upwardly through said tile 12 will be arranged both to fluidize said refractory particles 14 and also to provide a treatment atmosphere for components which are to be heat treated and which in use will be suspended in the bed. Desirably the layer of particles 15 immediately adjacent to the upper surface of said tile 12 will be of greater density and/or will be of coarser size than the remainder of the particles so that said layer 15 will in practice remain unfluidized and thereby prevent said tile 12 from becoming unduly heated. The tile will thus be protected from the effects of high temperature. The provision of such layer 15 is however more particularly described in my copending U.S. patent application Ser. No. 112,576, now U.S. Pat. No. 4,340,433 (corresponding to British Application No. 38339/76). Cooling passages 16 may also be provided beneath the container 10 and cooling air can be passed through these passages both to assist in cooling said tile further and also to assist in cooling the incoming gaseous medium which passes through the first conduit means 13. A removable hood arrangement, generally indicated by reference numeral 17, is also provided at the upper end of the fluidized bed and such hood will of course be placed in position after components have been loaded into the bed.

There is also provided second conduit means for admitting into the upper part of the bed air and/or a combustible gas. Said second conduit means comprise, in the example shown in the drawing, air conduit means and separate gas/air conduit means which are both located adjacent to the top of the bed but beneath the upper surface of the mass of refractory particles when the latter are fluidized. The air conduit means comprises two generally semi-circular pipes 18 and 19 which are each provided with apertures or nozzles 20 through which air can issue into the upper part of the mass of refractory particles. Furthermore the pipe 18 is connected to a supply pipe 21 which at its inner end extends vertically downwardly into the upper end of the container 10 whereas the pipe 19 is connected to a similar supply pipe 22. It will be noticed that both of said pipes 21 and 22 do not pass through the wall of the container 10 at positions below the level of said upper surface of the mass of refractory particles when fluidized and in fact said pipes conveniently extend respectively through a pair of diametrically opposed notches formed in the upper edge of the container 10 and thence through the adjacent insulation 11. This arrangement whereby the supply pipes (which in use would be connected to a supply of compressed air and suitable valve assemblies) do not pass through the wall of the container below the upper surface of the mass of refractory particles provides an important advantage over known constructions in which supply pipes are passed through the wall of the container below said upper surface of the refractory particles in that increased localized stresses may be caused where the pipes extend through the container or alternatively there may be problems in forming effective seals.

The gas/air conduit means also forming part of said second conduit means comprises a pair of generally semi-circular pipes 23 and 24 which are each provided with apertures or nozzles 25. The pipe 23 is connected at its two ends to a pair of supply pipes 26 and 27 whereas the pipe 24 is connected at its two ends to a pair of supply pipes 28 and 29 and through each of said supply pipes 26, 27, 28 and 29 a gas/air mixture will be passed when desired in order that such mixture can flow through the apertures or nozzles 25 and into the upper part of the fluidized bed. It will also be noticed that said supply pipes 26, 27, 28 and 29 (which in use will be connected by suitable valves to a pressurised supply of gas/air mixture) also extend in part downwardly into the container from the upper end thereof without passing through the wall of said container at positions below the level of said upper surface of the refractory particles when fluidized. Conveniently said pipes 26, 27, 28 and 29 are bent at their upper ends into horizontal portions which extend through a pair of diametrically opposed notches formed in the upper end of said container 10, said notches being arranged on a diameter which is at right angles to the diameter containing the notches through which the supply pipes 21 and 22 extend. Furthermore the vertical portions of said pipes 26, 27, 28 and 29 extend downwardly into the container between the ends of the pipes 18 and 19. It will thus be appreciated that the pipes 26, 27, 28 and 29, like the pipes 21 and 22, do not pass outwardly through the container 10 at positions beneath the upper surface of the refractory particles and therefore will similarly not cause any problems with regard to sealing or with regard to the localized raising of stresses within the container. It will also be noticed that the pipes 23 and 24 are generally vertically aligned with the pipes 18 and 19 when the container is viewed in plan, all of these pipes fitting close to the interior surface of the wall of the container so as to leave the maximum opening at the top of the container for the admission of components or a basket containing such components which are to be heat treated.

The air supply pipes 21 and 22 also include nozzles 30 which are disposed above the upper surface of said mass of refractory particles and which are arranged in use to direct jets of air onto the central part of the upper surface of said refractory particles. Such jets of air, when air is in fact supplied to the pipes 21 and 22, have the effect of burning any unburned combustible gases that may rise from the bed in use.

The fluidized bed is also provided with at least two temperature transducers in the form of thermocouples indicated by reference numeral T1 and T2. Preferably however there is also provided a third temperature transducer in the form of another thermocouple T3. The transducer T1 is disposed, in the example shown, just above the upper surface of a support grid 7 which will in use support a work basket 6. The transducer T3 is disposed at a higher level and may be for example approximately in the centre of the depth of the bed. The transducer T2 is disposed near to the upper surface of the bed and adjacent to the aforementioned second conduit means. All of said transducers T1, T2 and T3 are supported by tubes which contain electrical leads and which conveniently extend downwardly into the bed from one of the aforesaid notches formed at the top of the bed so that such tubes also do not pass through the wall of the bed.

The transducers T1 and T2 are electrically connected together so as to provide an electrical signal which is dependent upon the difference in the temperatures measured by said transducers T1 and T2 at their respective levels and this electrical signal is arranged to energise the electric motor 9 in order to actuate the control valve 8. The transducers T1 and T2 are however programmed so that the electric motor 9 is not brought into action unless the temperature difference between the levels of said transducers exceeds a predetermined value.

The transducer T3 is used to provide a measure of the temperature of the centre of the bed when required but is not ordinarily used in the automatic control of fluidization which is effected through transducers T1 and T2. Transducer T3 does however provide valuable information relating to the temperature conditions in the centre of the working zone of the bed.

Thus, in starting up, the fluidizing medium will be admitted to the bed via the supply pipe 13 and heat will be supplied at the top of the bed through the second conduit means comprising said pipes 18, 19, 26, 27, 28 and 29. Fluidization of the mass of refractory particles above the layer 15 will initially occur but heat will not travel downwardly through the bed from the second conduit means until the fluidization velocity is approximately three times the minimum velocity required to produce fluidization at any given temperature. The transducer T1 will therefore indicate a lower temperature than T2 and so long as this temperature difference exceeds a predetermined difference then a signal will be passed to the motor 9 to open further the control valve 8 and thereby increase the degree of fluidization until the necessary increased velocity has occurred to permit heat to extend downwardly from the top of the bed. Eventually the temperature of transducer T1 will approach the temperature of transducer T2 and conditions will be stabilized so that said motor actuates the valve 8 to maintain the temperature in the bed at a more or less constant value.

If in fact the gaseous medium entering the bed via the conduit 13 comprises a fuel rich gas/air mixture, then air only need be supplied at the top of the bed. If on the other hand the gaseous medium which is used in the bed does not contain a gaseous fuel then a non-combustible gas/air mixture may be admitted through the pipes 23 and 24, and air through the pipes 18 and 19 to form a combustible mixture which is ignited within the bed.

The lowest transducer T1 incidentally will also provide a check that the components at the bottom of the work basket 6 are being correctly heated and in addition will ensure that the bed is not fluidized which is a condition which is difficult to determine visually but it is desirable to prevent such over fluidization as expensive fluidizing gases will be saved. Moreover, if desired, a flow meter (not shown) can be used in addition to the control valve 8, such flow meter being designed to measure the total flow through the valve. The flow meter can be calibrated to provide a measure of the bed temperature as well as giving the equivalent flow. This provides a means of manually adjusting the flow through the bed by direct observation of the bed temperature should the need arise and provides a check on the automatic control performance.

In an alternative arrangement (not shown) an additional layer of coarser and/or denser particles is provided above the layer 15 but below the upper surface of the support grid 7, said transducer T1 then being disposed beneath said grid 7 and extending into said additional layer. The particles comprising this additional layer are however not so coarse and/or not so dense as the particles in the layer 15 but they are coarser and/or denser than the particles in the upper part of the bed and in such an arrangement it is intended that the particles in the additional layer shall never become fluidized either during operation of the bed. This means that the transducer T1 will not receive so much heat from the second conduit means and there will in fact be a reverse effect as compared with the arrangement above described in that an increased supply of fluidizing medium through the bed will have the effect of cooling the transducer T1. Thus if the temperature difference between the transducer T1 and T2 in this alternative arrangement is below the predetermined difference then the electrical signal produced by the temperature difference will energise the motor 9 to actuate the valve 8 in a direction to increase the flow of fluidizing medium and thereby lower the temperature in the bed. On the other hand if the temperature difference between the transducers T1 and T2 exceeds the predetermined or set difference in this alternative arrangement then the electric motor 9 will act to reduce the flow of fluidizing medium through the bed in order to permit the temperature within the bed to rise.

There is also provided, in the example shown, third conduit means which comprise two further semi-circular pipes 31 and 32, pipe 31 being connected at its ends to two supply pipes 33 and 34 and pipe 32 being connected at its two ends to two supply pipes 35 and 36. As will be seen from the drawing the pipes 31 and 32 are disposed adjacent to the interior surface of the wall of the container 10 but at a lower level than said second conduit means and in fact there may be disposed at a level which is approximately half-way in the depth of the mass of refractory particles. The supply pipes 33, 34, 35 and 36 would be connected to a supply of compressed air through suitable valves and the arrangement is such that these pipes can be used when desired to pass a supply of cooling air through the pipes 31 and 32, such pipes however not having any nozzles or apertures through which air can escape into the bed. Thus for example with respect to pipe 31 air will flow into said pipe through one of the supply pipes 33 and 34 and then out through the other and this cooling air would be introduced whenever it is desired to provide for a relatively rapid cooling phase in a heat treatment operation. It will also be noticed however that said pipes 33, 34, 35 and 36 extend in part in a vertical direction from the upper end of the container, the vertically extending portions of said pipes being disposed between the vertically extending portions of pipes 26, 27 28 and 29. The upper parts of pipes 33, 34, 35 and 36 are bent to extend in horizontal directions so that the pipes can then extend through the notches at the upper end of the container through which the pipes 26, 27, 28 and 29 extend. Again therefore the pipes 33, 34, 35 and 36 do not pass through the wall of the container at a position below the level of the upper surface of the mass of refractory particles.

I claim:

1. A fluidized bed having a container for containing a mass of refractory particles, a porous base, conduit means for supplying a fluidizing medium to the underside of said porous base from which said medium will flow through the porous base and into the mass of refractory particles, an adjustable valve for the conduit means and means, disposed above said porous base, for supplying heat to the mass of refractory particles, the fluidized bed comprising:
   a pair of temperature transducers disposed at vertically spaced positions above the upper surface of said porous base, said transducers being connected together to provide a signal which is dependent upon the difference in the temperatures at said vertically spaced positions;
   power-actuated means arranged to receive said signal and to actuate said adjustable valve in accordance with the signal received; and,
   second conduit means disposed in the upper part of said bed, but beneath the upper surface of the mass of refractory particles when fluidized, for admitting a gas into said upper part of the bed, said second conduit means being connected to supply pipes which extend at least in part downwardly into the container from the upper end thereof without passing through the wall of the container at positions below the level of said upper surface of the mass of refractory particles when fluidized.

2. A fluidized bed as claimed in claim 1, wherein said second conduit means comprises separate air conduit means and gas/air conduit means, said air conduit means and gas/air conduit means extending around the inner surface of the wall of the container and being generally vertically aligned with each other, whereby said second conduit means will not occupy an unacceptably large amount of the cross-sectional area of the container when seen in plan view.

3. A fluidized bed as claimed in claim 1, further comprising third conduit means which are disposed in said bed beneath the second conduit means, said third conduit means being connected to air supply pipes which also extend at least in part downwardly into the container from the upper end thereof without passing through the wall of the container at positions below the level of the upper surface of the mass of refractory particles when fluidized, said third conduit means being adapted for use in cooling the bed so that cooling air can be passed through the third conduit means when desired without being discharged into the fluidized bed.

4. A fluidized bed as claimed in claim 2, further comprising third conduit means which are disposed in said bed beneath the second conduit means, said third conduit means being connected to air supply pipes which also extend at least in part downwardly into the container from the upper end thereof without passing through the wall of the container at positions below the level of the upper surface of the mass of refractory particles when fluidized, said third conduit means being adapted for use in cooling the bed so that cooling air can be passed through the third conduit means when desired without being discharged into the fluidized bed.

5. A fluidized bed as claimed in claim 1, wherein the uppermost temperature transducer is disposed just below the upper surface of the mass of refractory particles when fluidized and the lowermost temperature transducer is disposed just above the upper surface of the porous base.

* * * * *